United States Patent [19]

Tulgan

[11] Patent Number: 4,746,296
[45] Date of Patent: May 24, 1988

[54] LEARNING DEVICE FOR INFANTS

[76] Inventor: Ronna L. Tulgan, 53 Amherst Rd., Pelham, Mass. 01002

[21] Appl. No.: 16,554

[22] Filed: Feb. 19, 1987

[51] Int. Cl.⁴ .............................................. A63B 69/00
[52] U.S. Cl. .................................... 434/247; 446/227
[58] Field of Search ................ 434/247, 258; 446/227; 272/8 M, 8.5

[56] References Cited

U.S. PATENT DOCUMENTS

| | | | |
|---|---|---|---|
| 3,538,620 | 11/1970 | Kohner et al. | 434/258 |
| 4,188,745 | 2/1980 | Harvey | 446/227 |
| 4,638,997 | 1/1987 | Clark et al. | 434/247 |

*Primary Examiner*—Richard C. Pinkham
*Assistant Examiner*—T. Brown
*Attorney, Agent, or Firm*—Paul J. Cook

[57] ABSTRACT

A learning device for infants is provided which includes two mirrors in a frame means adapted to be positioned substantially perpendicular to each other and wherein at least one mirror is provided with a shade. A movable rod with a handle and arm is rotatably mounted between the two mirrors. An object is connected to the arm which can be moved by the infant. The device also includes a transparent retainer having a movable shade. The retainer is adapted to house an object connected to a flexible line that can be moved by the infant. A series of timer devices can be included which are manipulated by the infant.

9 Claims, 2 Drawing Sheets

LEARNING DEVICE FOR INFANTS

BACKGROUND OF THE INVENTION

This invention relates to a device for improving learning skills of an infant.

At birth, infants begin to form a self-concept and an accompanying sense of self esteem. Essentially, the first psychological and cognitive tasks of life are to develop a sense of self, other, a perspective of environment and a sense of personal power in that environment.

Presently, there are toys available which are adapted to be placed in infant cribs and that include a multiplicity of devices which can be grasped by the infant in order to effect movement of an object or to provide sound to the infant. Some of these devices also include a small mirror for viewing by the infant.

Prior to the present invention, there has not been available a learning device which realistically depicts for the infant a three-dimensional environment in which the infant is placed. Accordingly, it would be desirable to provide such a device. In addition, it would be desirable to provide a device which assists the infant in developing a sense of self, other and a a sense of his position in his environment.

SUMMARY OF THE INVENTION

The present invention provides a learning device for infants which includes two mirrors in a frame means which are connected to each other by a hinge that permits the mirrors to be positioned approximately perpendicular to each other. The device is of a size such that it can be placed at a corner of a conventional infant crib or playpen. A shade is provided on at least one of the mirrors so that the infant can expose or cover a mirror during play. A rod having a handle and an object such as a ball or a bell attached thereto is rotatably mounted on the frame between the two mirrors so that the object on the rod can be viewed from either or both mirrors. The frame is also provided with a housing having an opening and a transparent retainer position within the opening. The housing contains an object that can be viewed through the transparent retained and the object is connected to a flexible line which can be grasped by the infant in order to move the object. The learning device also can have, housed within the frame, a plurality of similar objects but of different sizes and/or a plurality of elements having different colors, all of which are movable.

DESCRIPTION OF SPECIFIC EMBODIMENTS

Figure 1:
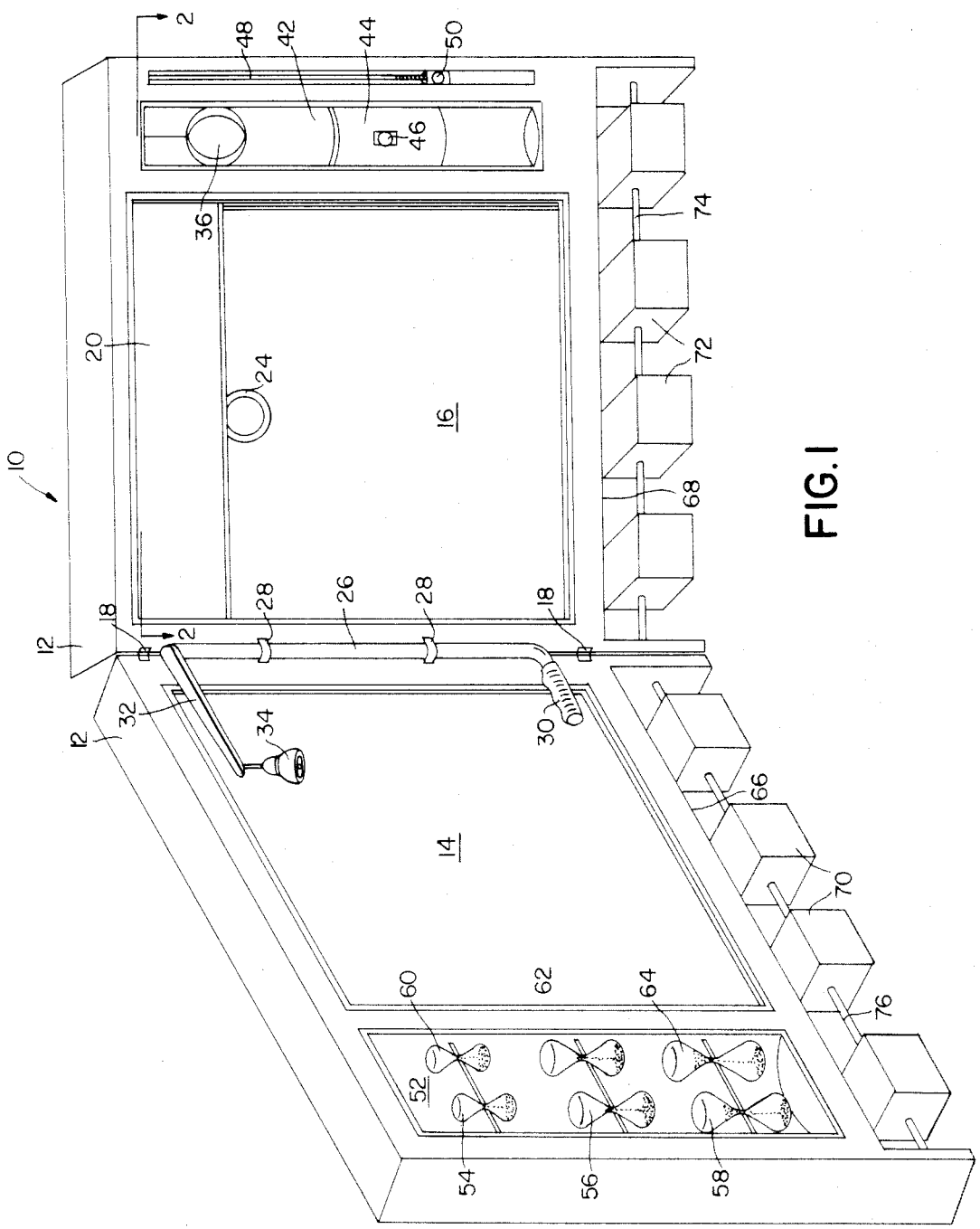
FIG. 1 is a perspective view of one embodiment of the learning device of this invention.
Figure 2:
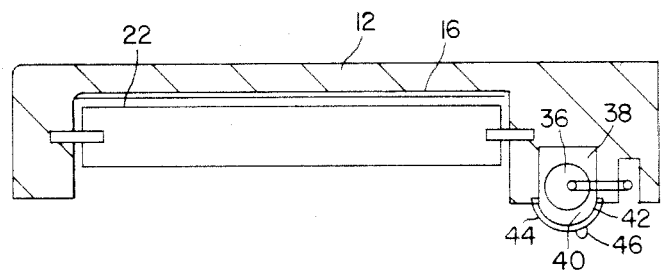
FIG. 2 is a cross-sectional view taken along line 2—2 of FIG. 1.

Referring to the figures, the learning device 10 includes a frame means 12 and two mirrors 14 and 16. The frame sections whichhold respectively mirrors 14 and 16 are joined together by means of hinges 18 so that the two mirrors 14 and 16 can be moved together or apart approximately 180° and, when placed in the corner of a rectangular or square crib or playpen can be positioned approximately perpendicular to each other. A shade 20 which is housed on roller 22 can be pulled by means of handle 24 to expose or cover all or a portion of the mirror 16. If desired, a similar shade 20 can be provided in a similar position for mirror 14. A rod 26 is rotatably mounted by means of straps 28 between the two mirrors 14 and 16. The rod 26 is provided with a handle 30 and arm 32 and an object 34 which is shown as a bell attached to arm 32. The object 34 could be any visually or sonically attractive object to an infant such as a multicolored ball or the like. The positioning of the mirrors where they are approximately perpendicular to each other enables a child to understand that s(he) is three-dimensional. When s(he) moves his/her head, the child will be able to see that the face and the back of the head move concomitantly. The mirrors also assist in the development of hand-eye coordination since the child can watch many angles when s(he) manipulates the different parts of the device. The shade permits the child to see the difference between two different perspectives. Also, the shade reinforces object permanence since the mirror remains in the same place when the child lifts the shade. The mirrors also teach the child cause and effect since, when the bell is manipulated by the handle, the rod or the object itself, the same effect is observed, i.e., movement of the object. Movement of the rod handle or the object also teaches the child a sense of agency since the child created the means for movement of the object and, in the case of a bell, the means for evoking a sound from the bell.

The learning provided by the two mirrors and the rotatably mounted object therebetween is reinforced by means of the provision of an object 36 shown as a multicolored or multitextured ball which is retained within a first housing 38 having an opening 40 over which is placed a transparent window 42 and a slidably mounted opaque sleeve 44 having a handle 46. A flexible line 48 is attached to the object 36 and to a handle 50 which can be grasped by the infant. Rather than utilizing a transparent window, the object 36 can be housed within a cylindrical transparent tube which fits into the housing 38 and encloses the object 36. The opaque sleeve 44 can extend about the periphery of the tube so that it can be slid on the tube. The arrangement in housing 38 reinforces the learning provided by the mirrors and the bell. Object permanence is taught since the object 36 remains in position even when covered by the sleeve 44 since it is still there when exposed. Cause and effect is also learned by the child by virtue of his/her pulling the handle 50 and watching the object 36 move. In addition, the sense of agency is taught by moving the handle 50 and watching the object 36 move. In addition, when utilizing an object 36 having a roughened surface, the ability to transfer sense such as imagining how surface of the ball may feel is learned.

In one aspect of this invention, a second housing 52 is provided which includes three different sized hour-glass timers 54, 56 and 58 each containing in the same amount of sand. Hour-glass timers 60, 62 and 64 are of different sizes and contain different amounts of sand. All of the timers 54, 56, 58, 60, 62 and 64 are mounted on rotatable rods so that they can be rotated to cause sand to move within them by gravity. This device teaches children about gravity, relationships of size and time and, once again, a sense of agency.

In another aspect of this invention, a third housing 66 and fourth housing 68 can be provided with rotatably mounted multicolored blocks or multitextured blocks 70 or 72 which are mounted on rods 74 or 76. Children can learn to count and to make patterns from the blocks. Alternatively, decals could be provided with printed numbers for each face of the blocks as an alternative learning device.

The primary feature of the present invention is the provision of the perpendicularly two-mirrored system which provides a three-dimensional perspective for what the child is doing in front of the mirrors. In addition, the device of this invention provides a means to develop a sense of self, a sense of power to manipulate one's own environment, to develop an understanding of motion, cause and effect, agency, hand-eye coordination, relationships, time and gravity as well as hours of constructive, enjoyable entertainment.

I claim:

1. A learning device for an infant which comprises
a frame means
two mirrors enclosed by said frame means and connected to each other by hinge means, said hinge means adapted to permit said mirrors to be positioned substantially perpendicular to each other,
at least one shade positioned to expose or cover at least one of said mirrors,
a first housing having an opening in said frame and containing a first object,
a transparent retainer positioned within said first housing and extending the length of said first housing opening
an opaque sleeve slidably mounted on said transparent retainer,
said first object being attached to a flexible line exposed for grasping by said infant,
a rod having a handle rotatably mounted on said frame and positioned between said mirrors,
and a second object attached to said rod, said second object being positioned to be viewed in either of said mirrors.

2. The device of claim 1 wherein said first object is a colored ball.

3. The device of claim 1 wherein said second object is a bell.

4. The device of claim 1 which includes a second housing within said frame, and, positioned within said housing third objects of varying size.

5. The device of claim 4 wherein said third objects comprised closed transparent hourglass structures containing sand.

6. The device of claim 1 which includes a third housing containing a plurality of rotatably mounted fourth objects.

7. The device of claim 6 wherein said fourth objects are multicolored cubes.

8. The device of claim 1 wherein the transparent retainer comprises a transparent tube.

9. The device of claim 1 wherein the transparent retainer comprises a transparent window.

* * * * *